United States Patent [19]
Mueller

[11] Patent Number: 5,932,058
[45] Date of Patent: Aug. 3, 1999

[54] PROCESS FOR MANUFACTURING A COMPACT DISC USING A CURING REGULATING FILTER

[75] Inventor: William Mueller, Clarks Summit, Pa.

[73] Assignee: WEA Manufacturing, Inc., Olyphant, Pa.

[21] Appl. No.: 08/808,280

[22] Filed: Feb. 28, 1997

Related U.S. Application Data

[60] Provisional application No. 60/012,560, Feb. 29, 1996.

[51] Int. Cl.⁶ .................................................. B32B 31/00
[52] U.S. Cl. .................................... 156/275.5; 156/275.7; 369/286
[58] Field of Search ............................. 156/275.7, 275.5, 156/99; 369/286

[56] References Cited

U.S. PATENT DOCUMENTS

| | | | |
|---|---|---|---|
| 4,539,220 | 9/1985 | Martinelli | 427/44 |
| 4,877,475 | 10/1989 | Uchida et al. | 156/275.7 |
| 5,269,867 | 12/1993 | Arai | 156/275.7 |

*Primary Examiner*—Jeff H. Aftergut
*Attorney, Agent, or Firm*—Gottlieb, Rackman & Reisman, P.C.

[57] ABSTRACT

The warping of the surface of a composite compact disc occurring during the bonding of two surfaces together to form the disc is reduced by the use of a curing filter that modulates the intensity of the ultraviolet light used to set the bonding agent. The curing filter may be in the form of a disc having a greater density near the periphery of the disc than at the center.

6 Claims, 5 Drawing Sheets

CURING REGULATING FILTER

FILTER SURFACE OF UV TRANSPARENT MATERIAL
WITH LIGHT ABSORBING OR REFLECTING GRADIENT
WHICH IS LIGHTER ON INSIDE AND DENSER ON OUTSIDE

PROCESS FOR MANUFACTURING A COMPACT DISC USING A CURING REGULATING FILTER

This application claims benefit of Provisional Application 60/012,560 filed Feb. 29, 1996.

FIELD OF THE INVENTION

This invention relates to the production of disc shaped optical recording media in which two thin disc-shaped layers are joined by the use of a light sensitive adhesive. In particular the invention relates to the prevention of warping of the media during the joining operations.

BACKGROUND OF THE INVENTION

Compact discs are record carriers for digital or analog information, for example audio and/or video information, which have the form of a flat disc-shaped plastic surface on which a data modulated optical structure is provided in accordance with the information. The data is formed as pits of varying length present in the surface and arranged in a spiral path. The pits have nanometer dimensions and are formed by injection molding against a mold having corresponding raised regions. The information stored on the compact disc is recovered in a reader, usually called a player, which rotates the compact disc and guides a laser device along the spiral track as the compact disc rotates. The presence or absence of pits under the laser is detected as a change in the luminance returned from the surface directly below the laser. In this manner the length of the pits is detected and decoded as data.

A newly developed data format for compact discs makes use of a very thin data layer into which the pits and lands are formed during injection molding. These pits have dimensions on the order of 250 nm, and the thickness of the data layer and its metallization coating is on the order of 0.6 mm. This thickness is advantageous to reduce the effect of coma of the reading laser beam if the disc becomes tilted during reading or deviates from planarity. In order to provide sufficient stiffness to the disc, however, it is necessary that it be thicker. The additional thickness is provided by adhesively bonding another disc surface to the data containing surface. The bonding operation however introduces tilt (i.e. deviation from planarity) to the data recorded layer of the disc. The present invention is concerned with the reduction of such tilt in the manufacture of compact discs made from thin disc layers bound together by a light curable adhesive.

During the manufacture of certain high density optical discs two surfaces on at least one of which the data has been recorded are bonded together using a light sensitive adhesive. The adhesive, which is sandwiched between the two layers of the disc is cured by heat and/or ultraviolet light. During the bonding process heat is generated that temporarily distorts the two disc layers in an asymmetrical fashion. For example, the inner diameter of the disc expands differently (generally with a greater vertical displacement) than the outer diameter of the disc. If curing is achieved during this "asymmetrical" time period, the composite disc realizes a significant distortion.

BRIEF DESCRIPTION OF THE INVENTION

It is an object of this invention to regulate the curing profile of the disc bonding process by means of a regulating filter. This filter functions to delay the curing of the outer diameter of the disc until its vertical displacement is nearly equivalent to that of the inner portion of the disc.

DETAILED DESCRIPTION OF A PREFERRED EMBODIMENT

Figure 1:
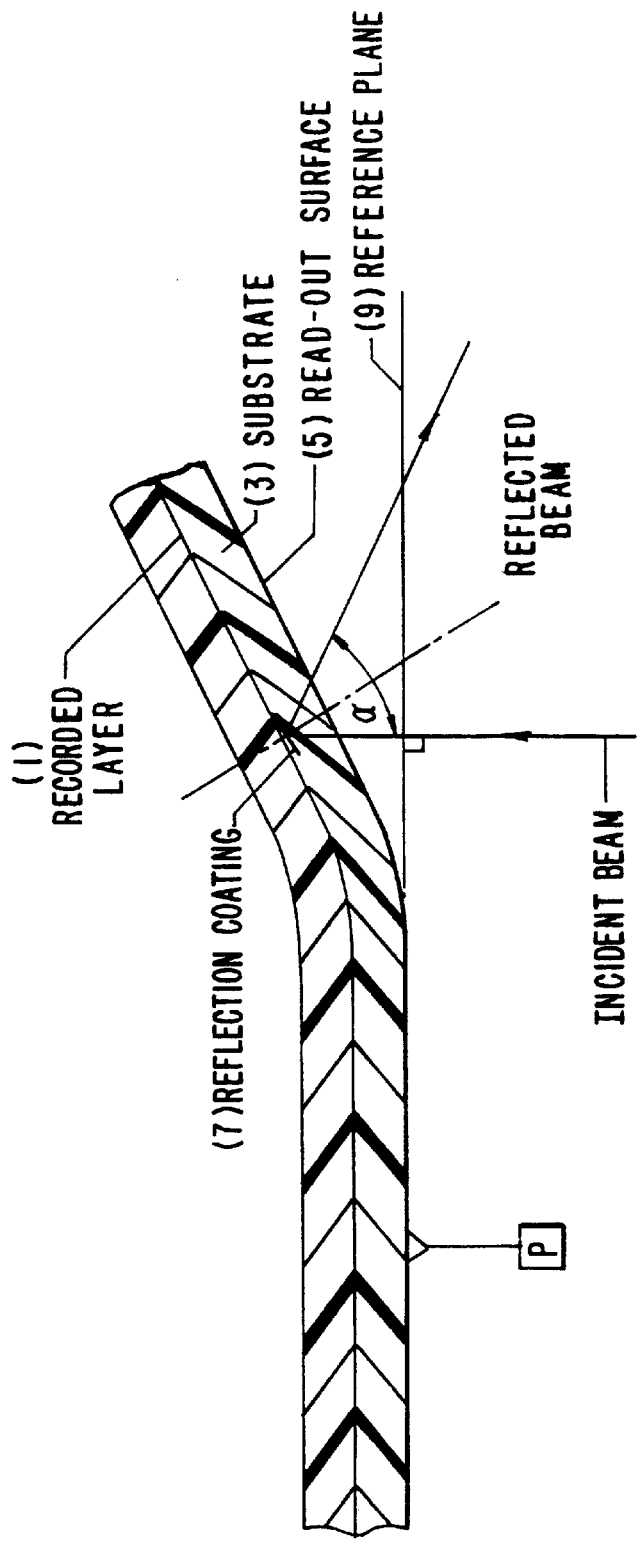
FIG. 1 is a cross section of half of a compact disc in which the disc has become tilted due to the differential expansion of the upper and lower surfaces of the disc.

The present invention has its application in an assembly line procedure for the mass manufacture of compact discs. The manufacture first produces the data containing surfaces preferably by injection molding and then enhances the reflectivity of the data surface by coating a metallization layer over the data surface. An adhesive which cures under ultraviolet light is subsequently applied to the disc and it is brought together on the assembly line by robotic control and mated with a supporting disc. As shown in FIG. 1, the further cure of the adhesive may result in a tilt of the recorded layer 1 as the substrate 3 on which it is formed and through whose readout surface 5 light is passed to decode the data in the recorded layer 1.

The deviation of the reflection coating 7 from the reference plane 9 is referred to as the disc tilt angle $\alpha$. It is an object of the invention to minimize the angle $\alpha$.

Figure 2A:
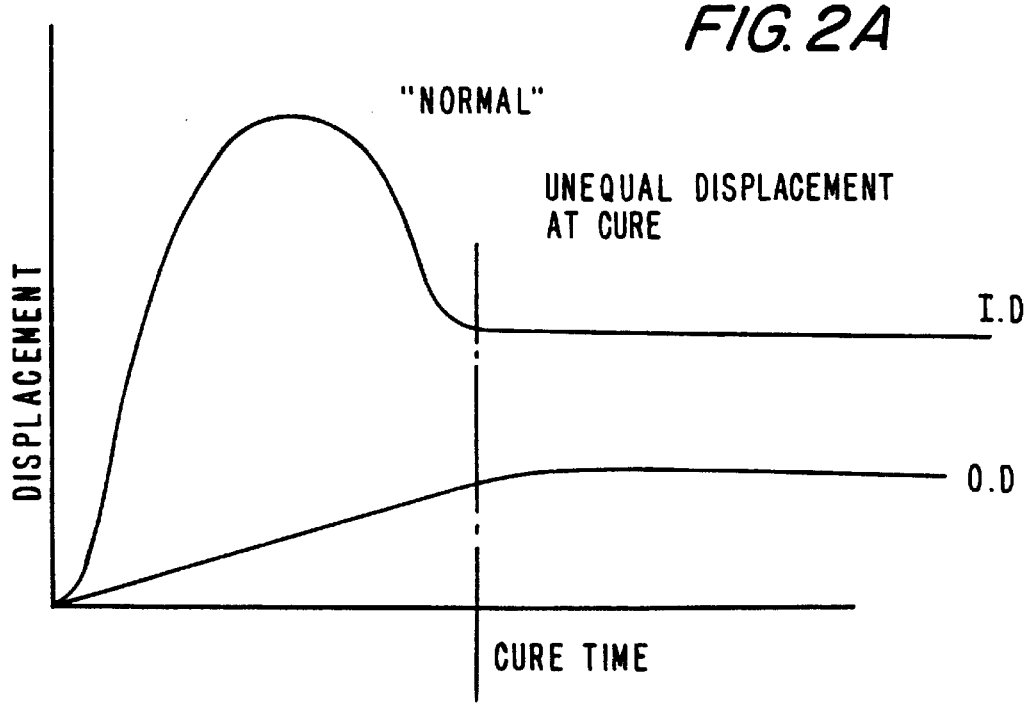
FIG. 2 depicts graphically the displacement of the disc inside and outside diameter as a function of time in the regulated and unregulated case.
Figure 2B:
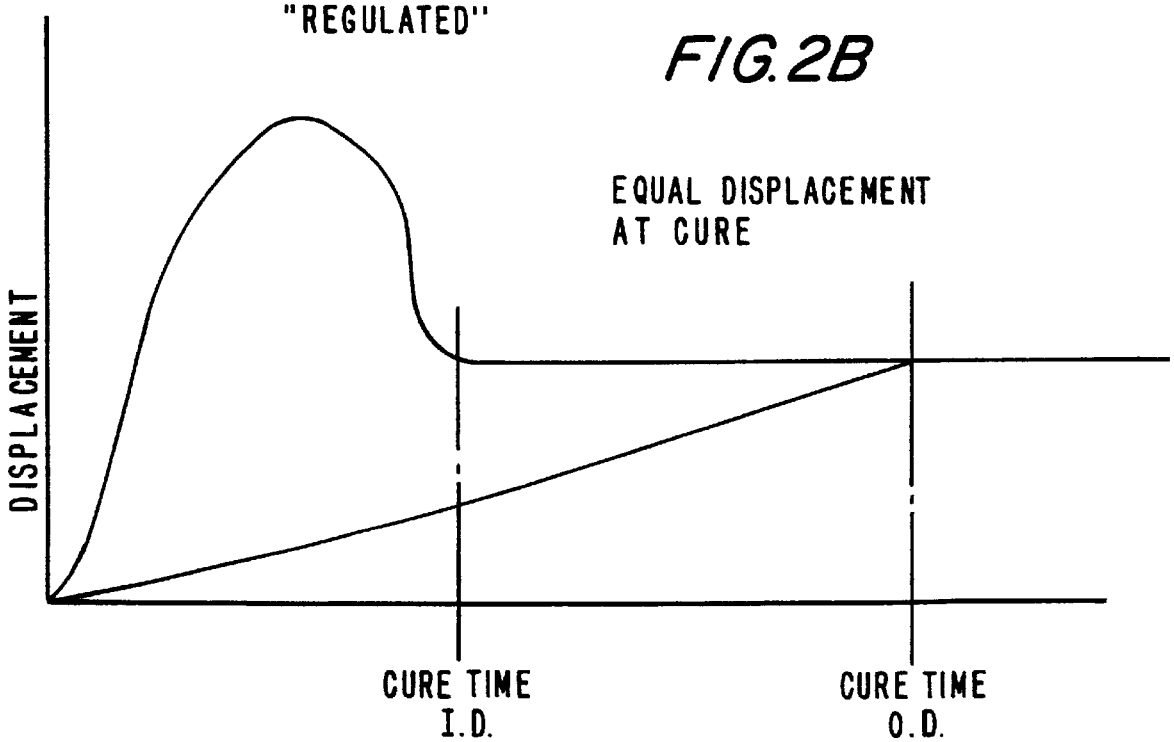

FIG. 2 shows in schematic form the typical displacement from planarity of the inside diameter and outside diameter of the disc in the "normal" case, when a curing regulating filter is not employed, as contrasted with the situation where the regulating filter is employed. It will be notice that the regulating filter results in equal displacements of both the inner and out diameter, which provides a flat final product.

Figure 3:
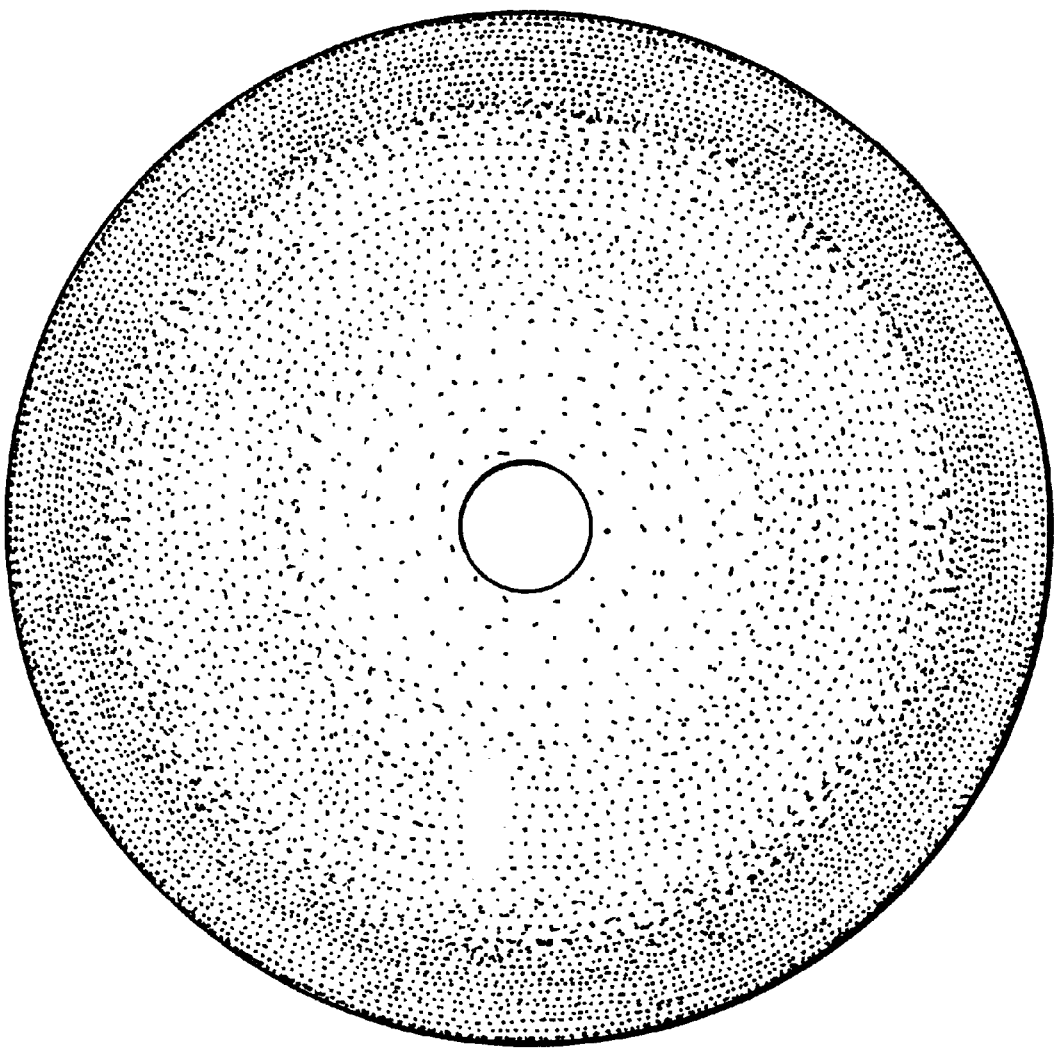
FIG. 3 is a top view of a curing regulating filter of the present invention.

FIG. 3 shows the radial density gradient of the ultra-violet absorbing material of the regulating filter. The material may be either uv absorbing or uv reflecting material, either of which will reduce the intensity of uv reaching the uv curable adhesive.

Figure 4:
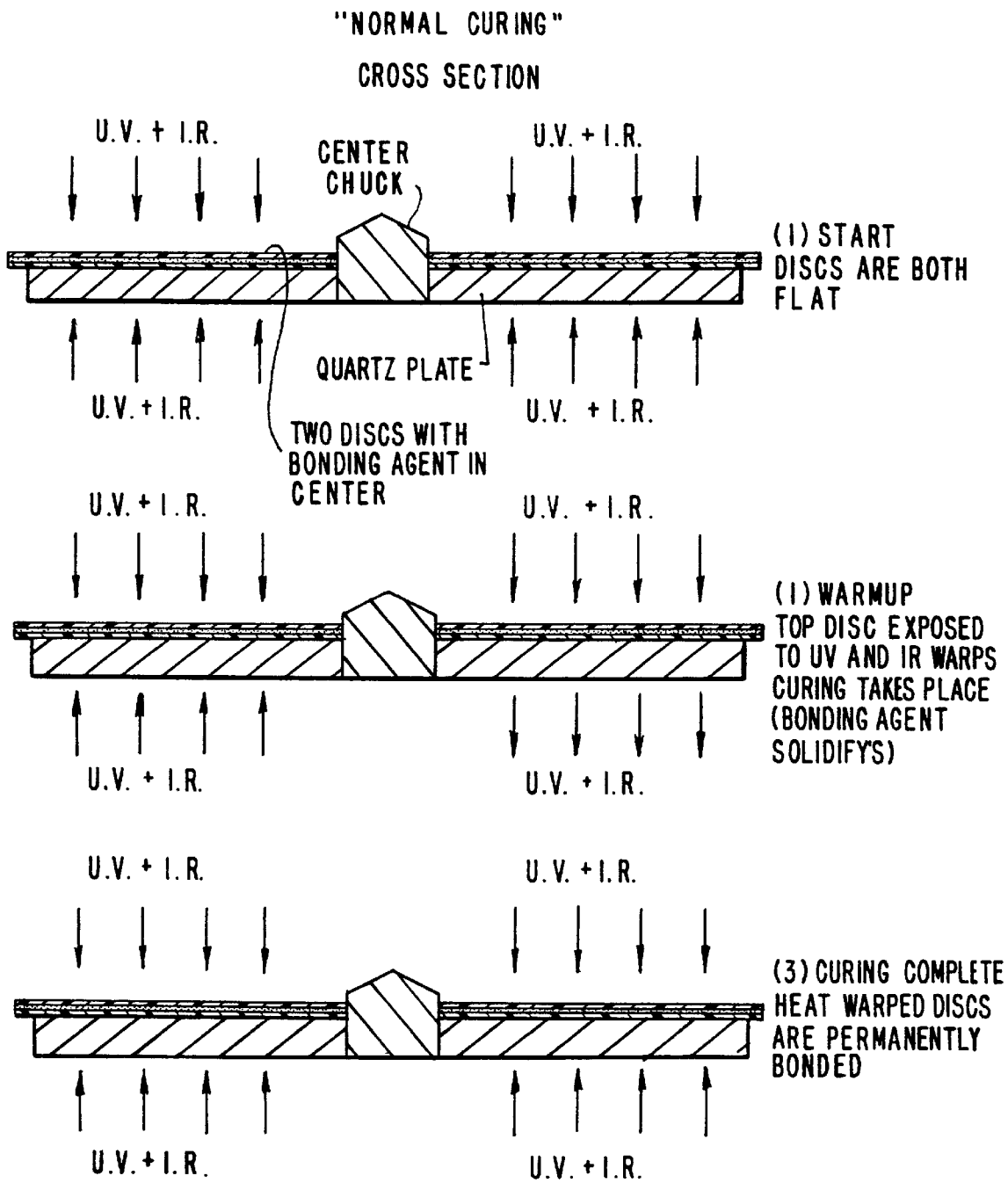
FIG. 4 depicts a time sequence of displacements of the surfaces of compact disc of the prior art.

FIG. 4 depicts the problematic results with normal curing. Here the two surfaces with the adhesive between them are placed on a quartz plate and irradiated both from above and below by ultra-violet and infra-red radiation. As depicted, the surfaces begin the process as flat surfaces. As the surfaces ward, the top disc warps as curing takes place and as the bonding agent begins to solidify. Finally, as curing is completed the heat warped discs are permanently bonded in their defective warped condition.

Figure 5:
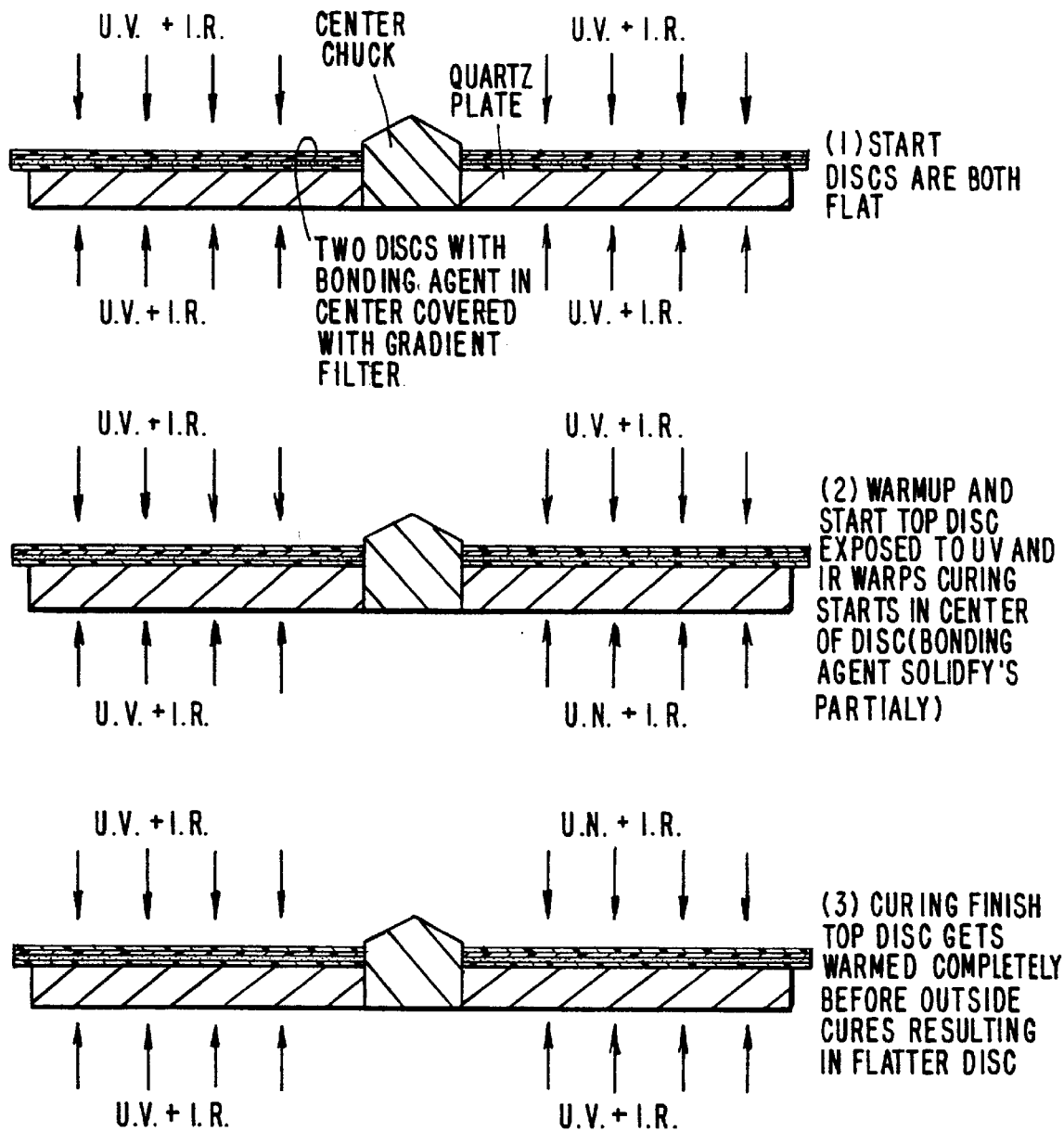
FIG. 5 depicts a time sequence of displacements of the surfaces of compact disc of the present invention

FIG. 5 depicts the process of the present invention. Again the process begins with both discs flat and with the adhesive layer between them. As the discs begin to warm up the top disc begins to warp as curing selectively begins in the center of the disc and the bonding agent begins to partially solidify. Due to the regulating filter, however, the the top disc becomes warmed completely before the outer radius of the disc cures with the result that the disc combination remains flat.

It is preferred therefore that prior to the application of ultra-violet light to effect the curing of the bonding agent, a filter disk of varying density, having greater density at its outer periphery is interposed between the ultra-violet light source and the compact disc. This may be accomplished by laying the filter disc upon the disc. The filter disc may either absorb or reflect the incident curing light. As a result there is a differential gradient in the cure rate of the disc that allows lateral motion to accommodate differences in the temperature and expansion of the disc surfaces. As a result greater planarity of the compact disc is achieved, which results in a smaller error rate during readout of the data from the compact disc.

While there have been shown and described and pointed out the fundamental novel features of the invention as applied to preferred embodiments thereof, it will be understood that various omissions and substitutions and changes in the form and details of the device illustrated and in its operation may be made by those skilled in the art without departing from the spirit of the invention. It is the intention, therefore, to be limited only as indicated by the scope of the claims appended hereto.

What is claimed is:

1. A method for manufacturing a compact disc formed of two surfaces bonded together, at least one of said surfaces comprising pits and lands recording optical data therein, said method comprising the steps of forming said first and second surfaces, applying a radiation curable adhesive to one of said surfaces and contacting said second surface in registration with said first surface, interposing a curing regulating filter between said compact disc and a source of curing radiation, irradiating said compact disc with curing radiation from said source, wherein said curing radiation is attenuated by said curing regulating filter, and said curing radiation varies radially after passing through said filter, said curing regulating filter comprising a radially varying density of material for absorbing said curing radiation, wherein said compact disc is flat after the curing of said adhesive.

2. The method of claim 1, wherein said curing radiation is in the ultra-violet spectrum.

3. The method of claim 1, wherein said radially varying density is greater at the outer periphery of the compact disc.

4. The method of claim 1, wherein said curing regulating filter has a disc shape with substantially the same radius as the compact disc, and said step of interposing a curing regulating filter comprises placing said filter in contact and in registration with said compact disc.

5. The method of claim 1, wherein said step of irradiating said compact disc employs radiation of an intensity that allows the two disc surfaces to move relative to one another during curing to allow the surface of the compact disc to remain flat.

6. The method of claim 1, wherein said two surfaces are not flat before the curing step, and said step of irradiating said compact disc employs radiation of an intensity that allows the two disc surfaces to move relative to one another during curing to allow the surface of the compact disc to become flat.

* * * * *